(12) United States Patent
Chen et al.

(10) Patent No.: US 12,203,781 B2
(45) Date of Patent: Jan. 21, 2025

(54) SENSOR DEVICE FOR HIGH SPEED ROTATING MACHINE

(71) Applicant: Industrial Technology Research Institute, Hsinchu (TW)

(72) Inventors: Xin-Qi Chen, New Taipei (TW); Chao-Yun Chen, Hsinchu County (TW); Chung-Che Liu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 225 days.

(21) Appl. No.: 17/846,321

(22) Filed: Jun. 22, 2022

(65) Prior Publication Data

US 2023/0143463 A1    May 11, 2023

(30) Foreign Application Priority Data

Nov. 8, 2021  (TW) ................. 110141519

(51) Int. Cl.
*G01D 5/20*     (2006.01)
*G01D 5/22*     (2006.01)
(Continued)

(52) U.S. Cl.
CPC ........... *G01D 5/204* (2013.01); *G01D 5/2013* (2013.01); *G01D 5/22* (2013.01); *G01D 5/2216* (2013.01); *H02K 11/225* (2016.01); *G01P 3/488* (2013.01)

(58) Field of Classification Search
CPC .......... G01D 5/20; G01D 5/2013; G01D 5/22; G01D 5/2208; G01D 5/2216; G01P 3/443;
(Continued)

(56) References Cited

U.S. PATENT DOCUMENTS 4,947,116 A * 8/1990 Welcome .................. G01P 3/49
324/161
5,696,444 A * 12/1997 Kipp .................... G01D 5/2013
324/207.16
(Continued)

FOREIGN PATENT DOCUMENTS

CN     202793302 U    3/2013
CN     102187181 B    3/2014
(Continued)

OTHER PUBLICATIONS

TW OA issued on Jan. 4, 2023.

*Primary Examiner* — Steven L Yeninas
(74) *Attorney, Agent, or Firm* — WPAT, PC

(57) ABSTRACT

A sensor device for high speed rotating machine includes a rotating body and a sensor assembly. The rotating body includes a magnetic permeable ring and at least one positioning structure. The magnetic permeable ring includes a radial displacement sensing area and a rotational speed sensing area, and the positioning feature is arranged in the rotational speed sensing area. The sensor assembly includes four radial displacement sensors and two rotational speed sensors. The radial displacement sensor is a double-probe type sensor, and the speed sensor is a double-probe or four-probe type sensor. Through different types of the rotational speed sensors and the radial displacement sensors, the rotation speed and turning direction of the rotating body can be calculated.

16 Claims, 21 Drawing Sheets

(51) Int. Cl.
  *G01P 3/488* (2006.01)
  *H02K 11/225* (2016.01)
(58) Field of Classification Search
  CPC .. G01P 3/48; G01P 3/49; H02K 11/21; H02K 11/225; F16C 32/0446; F16C 32/0448
  See application file for complete search history.

(56) References Cited

U.S. PATENT DOCUMENTS

| | | | |
|---|---|---|---|
| 6,107,794 A | 8/2000 | Kipp et al. | |
| 7,095,198 B1 | 8/2006 | O'Brien | |
| 7,694,540 B2 | 4/2010 | Ishida et al. | |
| 8,167,499 B2 | 5/2012 | Taniguchi et al. | |
| 8,772,992 B2 | 7/2014 | Lee et al. | |
| 8,875,588 B2 | 11/2014 | Kim et al. | |
| 9,134,141 B2 | 9/2015 | Lin et al. | |
| 9,389,148 B2 | 7/2016 | Lee | |
| 9,513,143 B2 | 12/2016 | So et al. | |
| 2007/0058892 A1 | 3/2007 | Motohashi et al. | |
| 2013/0009631 A1 | 1/2013 | Tsuge et al. | |
| 2013/0057097 A1* | 3/2013 | Choi | G01B 7/144 324/207.17 |
| 2013/0328455 A1* | 12/2013 | Wu | H02K 11/21 310/68 B |
| 2016/0313143 A1* | 10/2016 | So | G01P 3/44 |
| 2017/0264146 A1* | 9/2017 | Shibata | H02K 29/03 |
| 2017/0338616 A1* | 11/2017 | Kurosu | F16C 32/0446 |
| 2017/0370788 A1 | 12/2017 | Neuschaefer-Rube et al. | |

FOREIGN PATENT DOCUMENTS

| | | |
|---|---|---|
| CN | 104833305 A | 8/2015 |
| CN | 105066857 A | 11/2015 |
| CN | 205792056 U | 12/2016 |
| CN | 107968540 A | 4/2018 |
| CN | 112834776 A | 5/2021 |
| EP | 1764521 B1 | 6/2011 |
| JP | 2006154352 A | 6/2006 |
| JP | 2010-173008 A | 8/2010 |
| TW | I570390 | 2/2017 |
| TW | 201829281 A | 8/2018 |

* cited by examiner

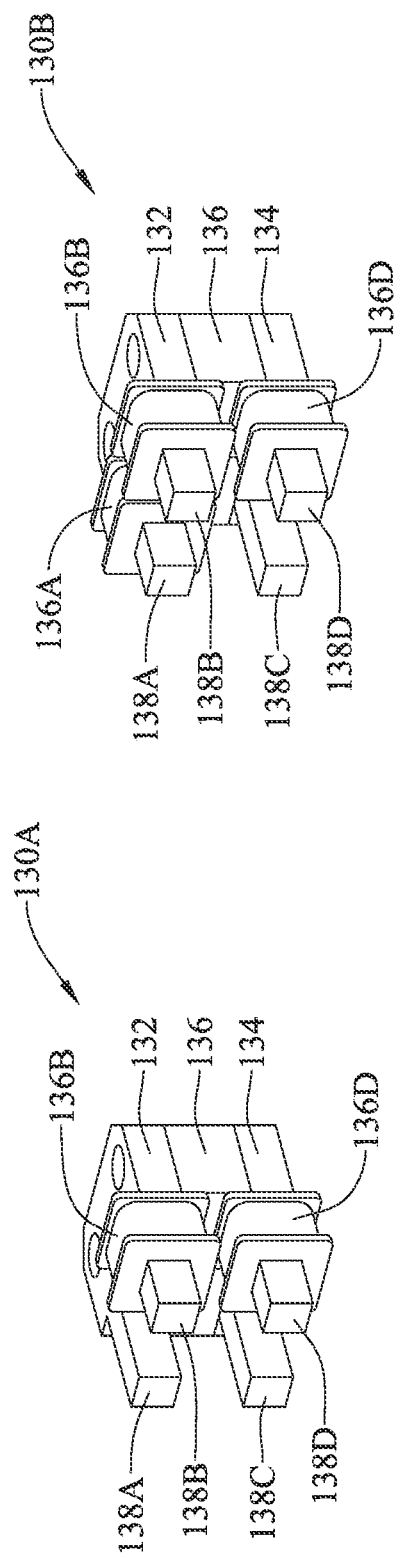

SENSOR DEVICE FOR HIGH SPEED ROTATING MACHINE

CROSS REFERENCE TO RELATED APPLICATION

This application claims the benefits of Taiwan application Serial No. 110141519, filed on Nov. 8, 2021, the disclosures of which are incorporated by references herein in its entirety.

TECHNICAL FIELD

The present disclosure relates in general to a sensor device for high speed rotating machine.

BACKGROUND

Generally, sensors used in high-speed rotating machinery can be divided into an eddy current type and an inductive type. In particular, for multi-purpose sensing, the inductive type is more suitable.

In the application of the maglev centrifugal compressor, non-contact suspension provided by a high-power and high-speed motor and maglev bearings would enhance the performance of the centrifuge to achieve higher efficiency and better energy saving. However, no rotating shaft can be produced with 100% concentricity or perfectly symmetrical/homogeneous axis. Though oscillation of the rotating shaft caused by unbalanced forcing may be reduced by dynamic balancing thereof, yet the oscillations of the rotating shaft at higher speeds can only be controlled by the magnetic bearings. Therefore, in order to suppress the unexpected shaking caused by the eccentricity under high-speed operations, a satisfied maglev control collaborated with eccentric force algorithm with magnetron technology at the magnetic bearings can be better achieved through well knowledge in rotational speed signals of the rotating shaft. Generally, the configuration of the sensor probe, the routing of the sensing signal wiring and the design of the sensing signal circuit are too complicated to achieve lower cost and less manufacturing time. Therefore, how to improve or provide a sensor device able to resolve the above-mentioned problems will be an issue to be solved to the skill in the art.

SUMMARY

An object of the present disclosure is to provide a sensor device for high speed rotating machine that can provide versatile combinations of rotational speed sensors and radial displacement sensors to maintain detection stability of the rotational speed and reduce the complexity in designing related circuits. In addition, the space for mounting the rotating body can be substantially enlarged, and applicability to the critical situation having excessive spacing between the rotating body and the sensor can be much more feasible.

In one embodiment of this disclosure, a sensor device for high speed rotating machine includes a rotating body and a sensor assembly. The rotating body includes a magnetic permeable ring and at least one positioning structure. The magnetic permeable ring further includes a radial displacement sensing area and a rotational speed sensing area. The at least one positioning structure is disposed in the rotational speed sensing area. A top surface of the at least one positioning structure is different to a top surface of the magnetic permeable ring. The sensor assembly includes four radial displacement sensors and two rotational speed sensors. The four radial displacement sensors, disposed separately around the rotating body, are separately disposed in correspondence to the radial displacement sensing area, and each of the radial displacement sensors is separated from the magnetic permeable ring by a radial air-gap spacing. Each of the four radial displacement sensors is a double-probe type sensor. The two rotational speed sensors are disposed separately around the rotating body. Each of the two rotational speed sensors is disposed next to one of the four radial displacement sensors in correspondence to the rotational speed sensing area. Each of the two rotational speed sensors is the double-probe type sensor or a four-probe type sensor.

As stated, in the sensor device for high speed rotating machine of the present disclosure, output signals of the two rotational speed sensors are used to generate pulse waves through a differential circuit, and the rotational speed and turning direction of the rotating body can be calculated by measuring the frequency of the pulse waves. Also, different arrangements of the rotational speed sensors and the radial displacement sensors can be provided. Thus, the stability in detecting the rotational speed can be maintained, and the complexity in designing the circuit can be reduced. In addition, in the limited spacing around the rotating body, different spacing between the rotating body and the sensors can be arranged to meet different applications.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRA WINGS

The present disclosure will become more fully understood from the detailed description given herein below and the accompanying drawings which are given by way of illustration only, and thus are not limitative of the present disclosure and wherein.

Figure 1:
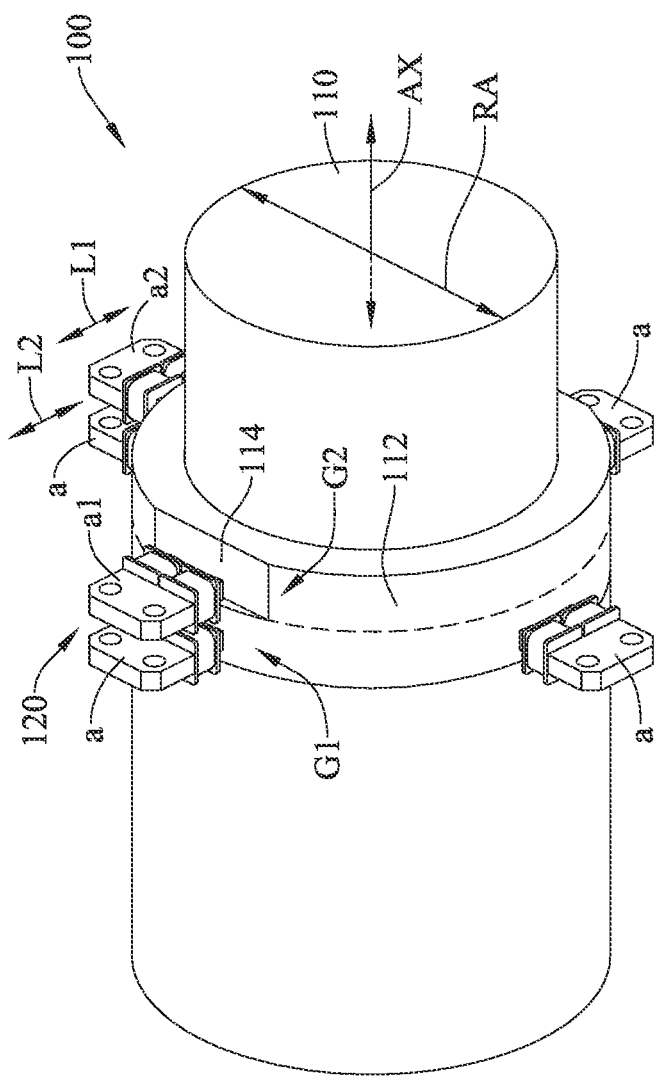
FIG. 1 is a schematic perspective view of an embodiment of the sensor device for high speed rotating machine in accordance with this disclosure.
Figure 5:
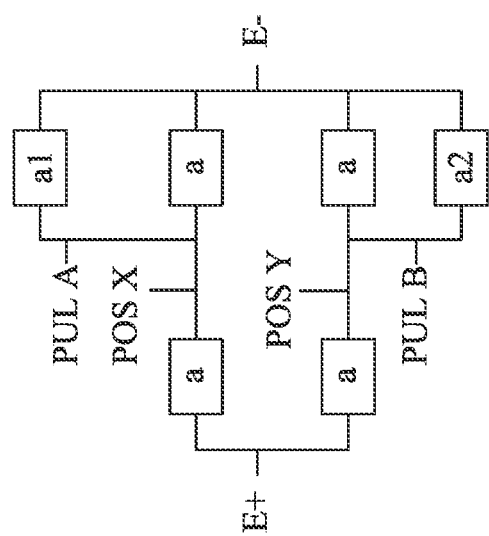
Figure 6:
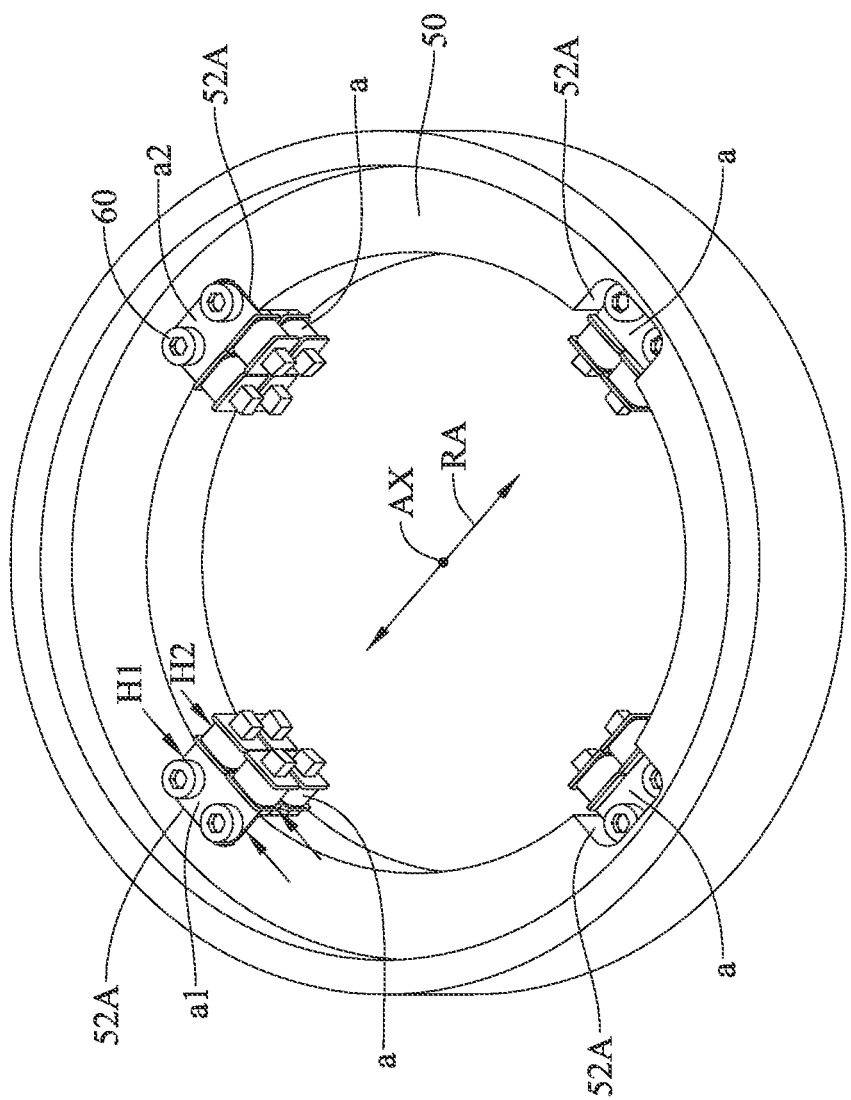
Figure 7:
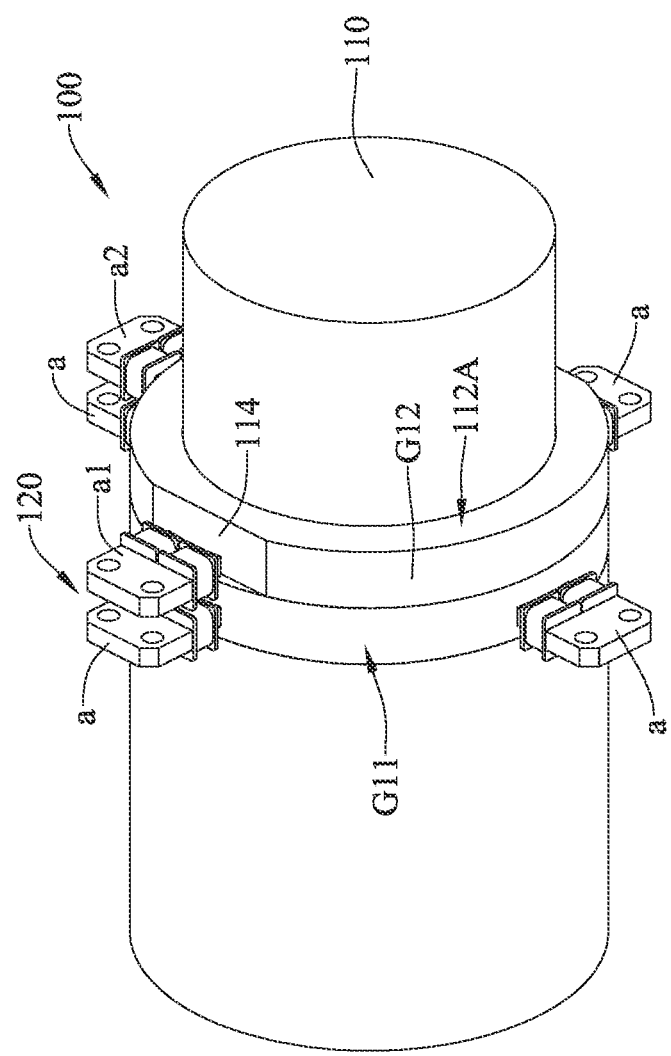
Figure 8:
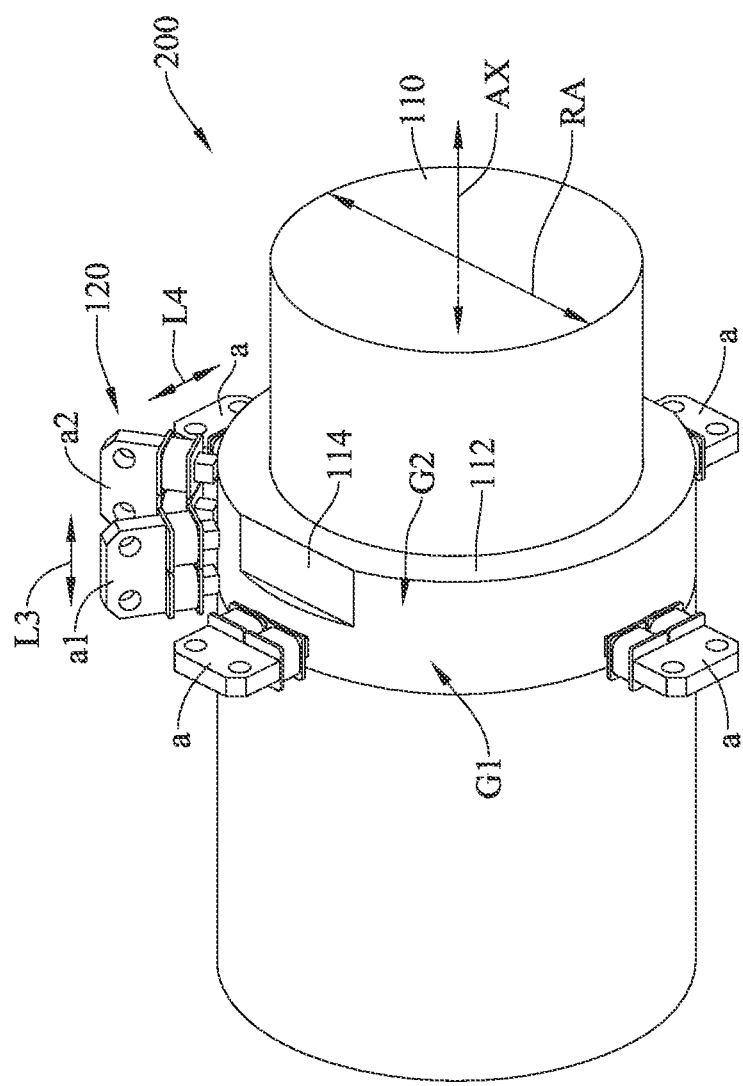
Figure 9:
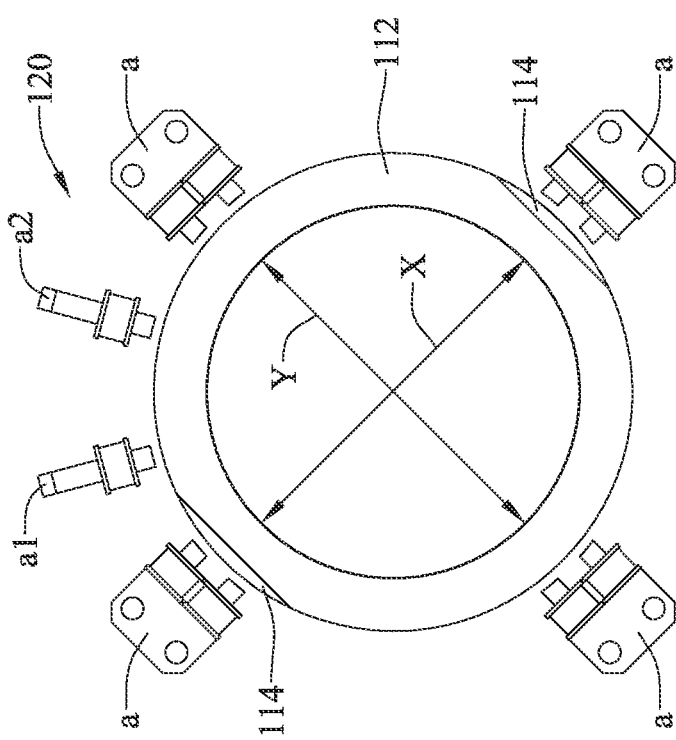
Figure 10:
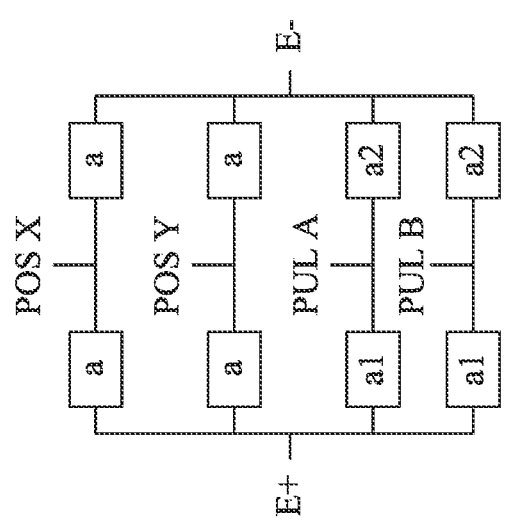
Figure 11:
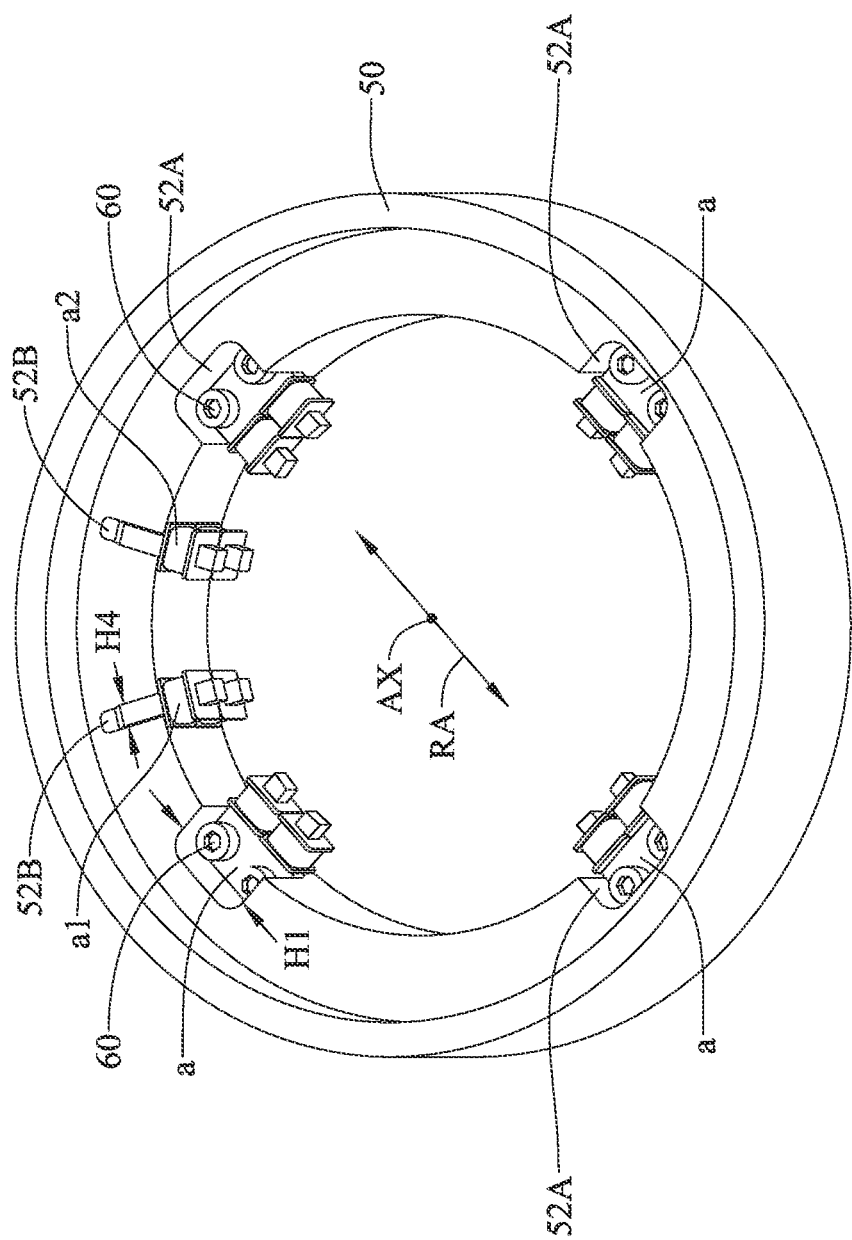
Figure 12:
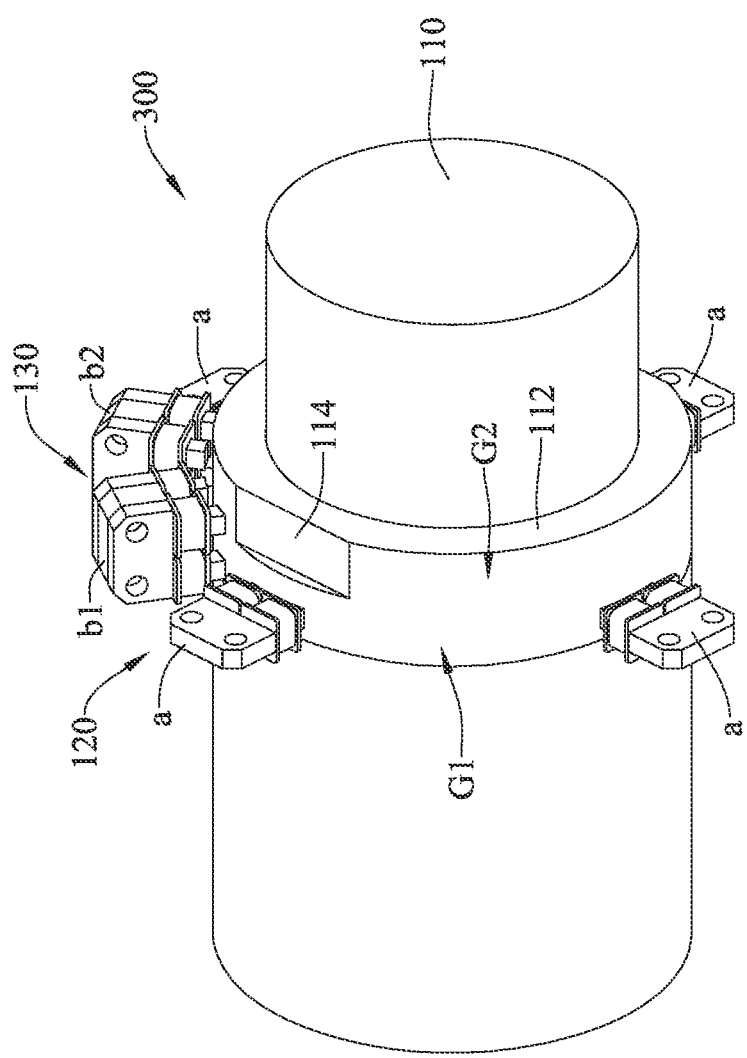
Figure 13:
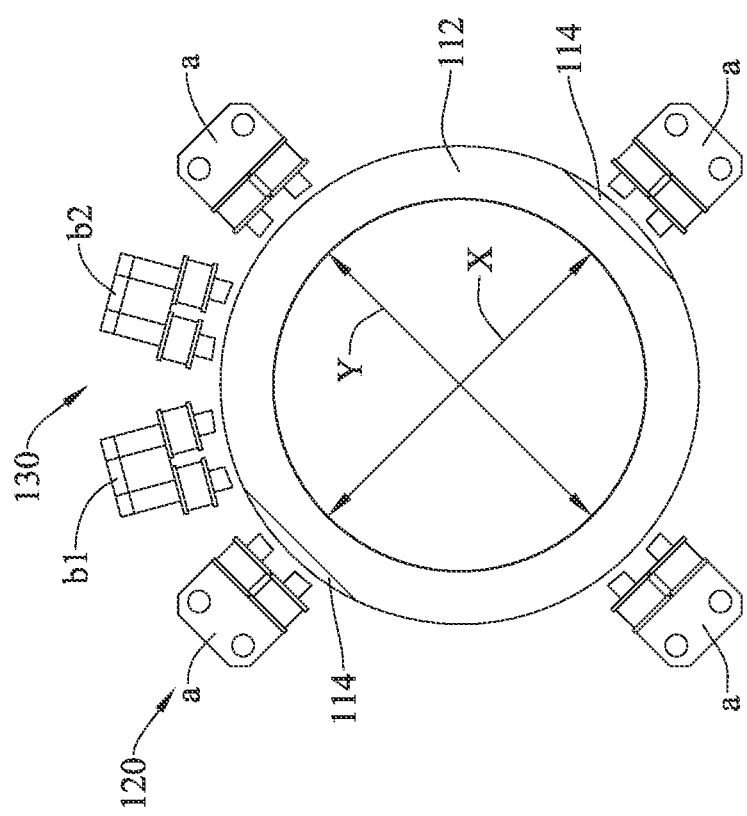
Figure 14B:
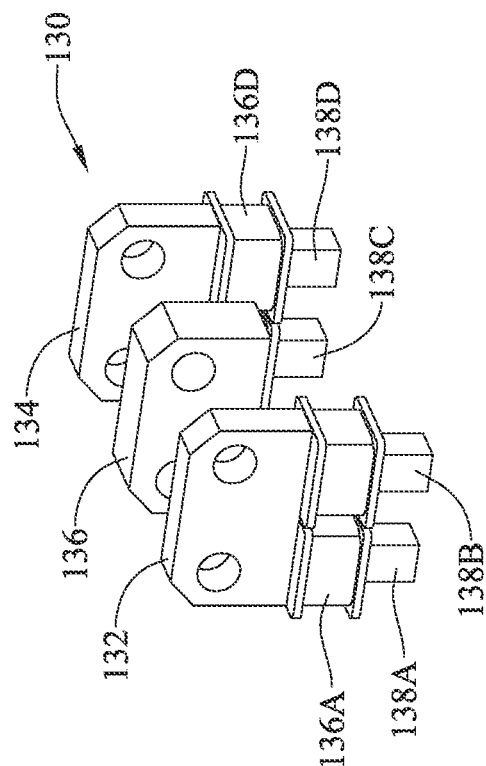
Figure 14A:
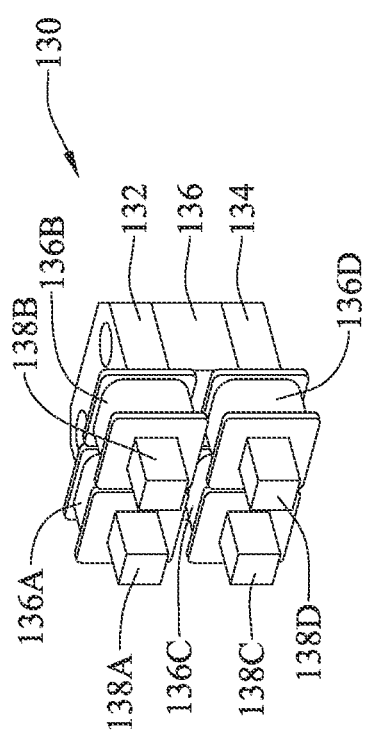
Figure 16:
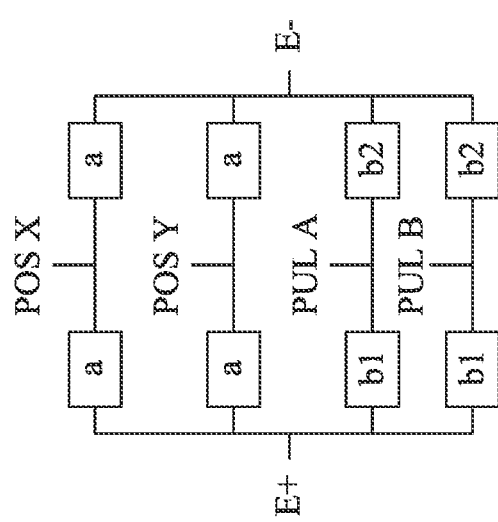
Figure 17:
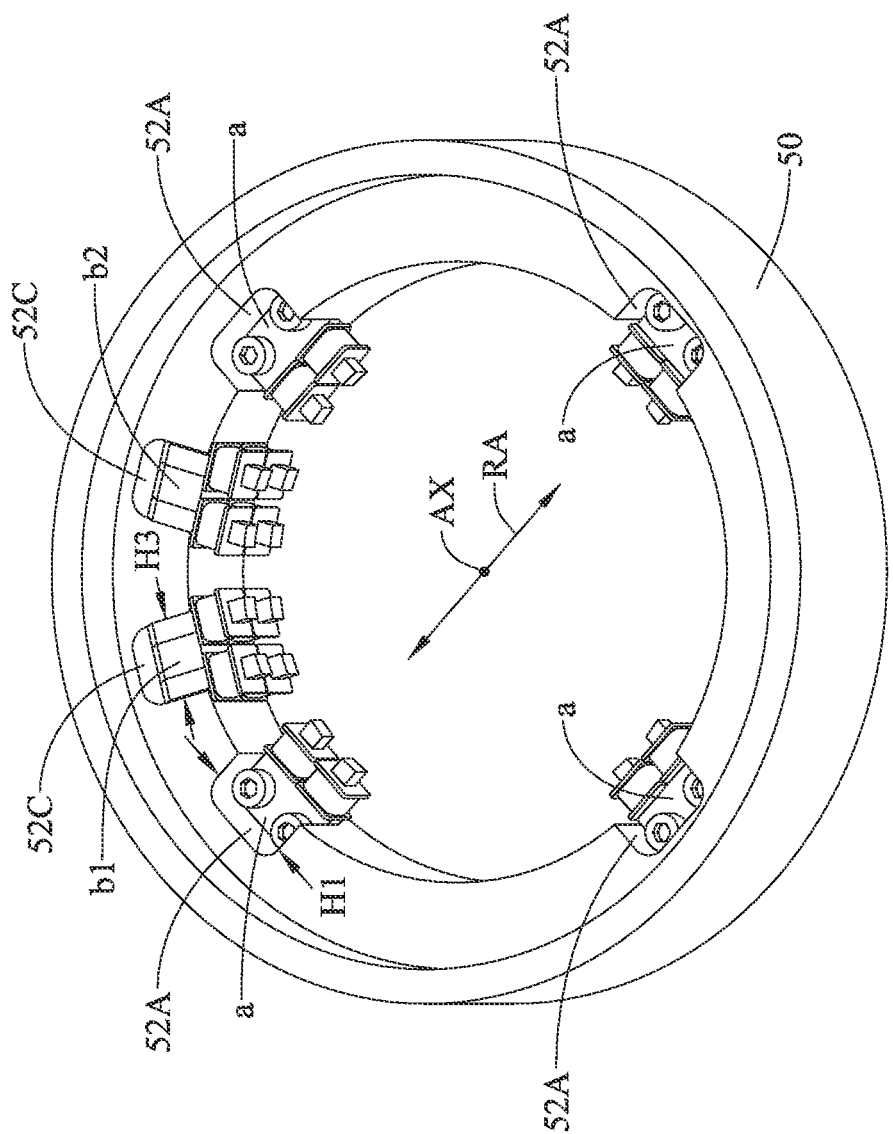
Figure 18:
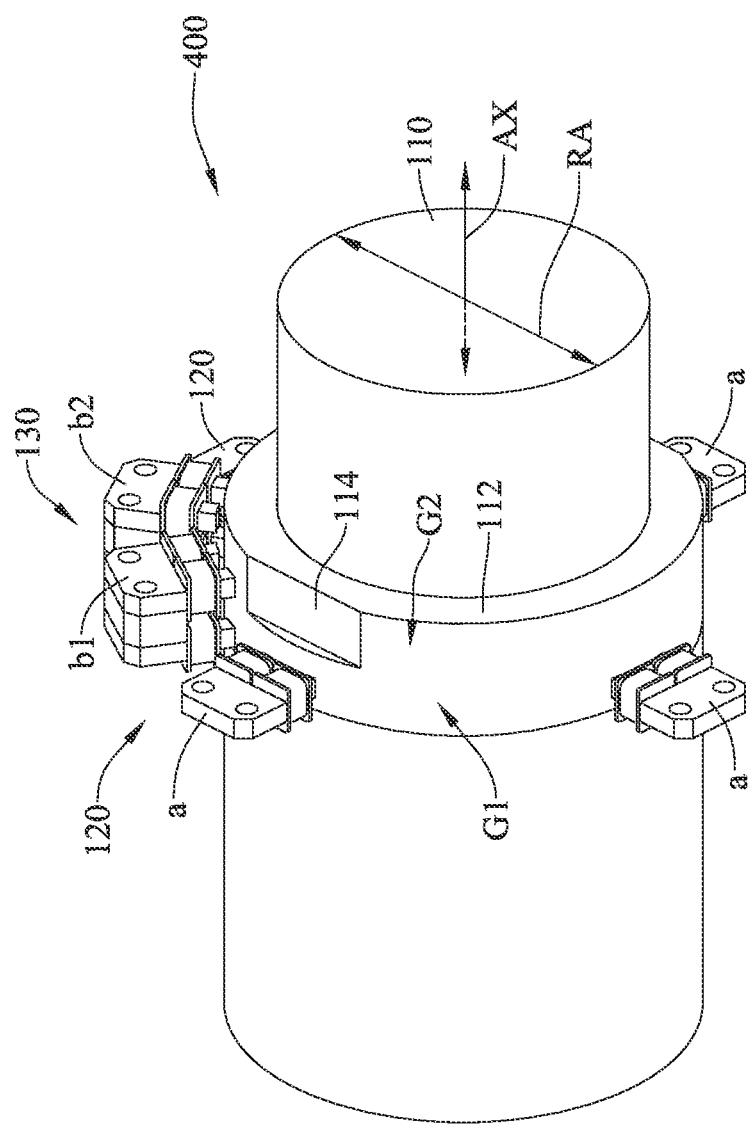
Figure 19:
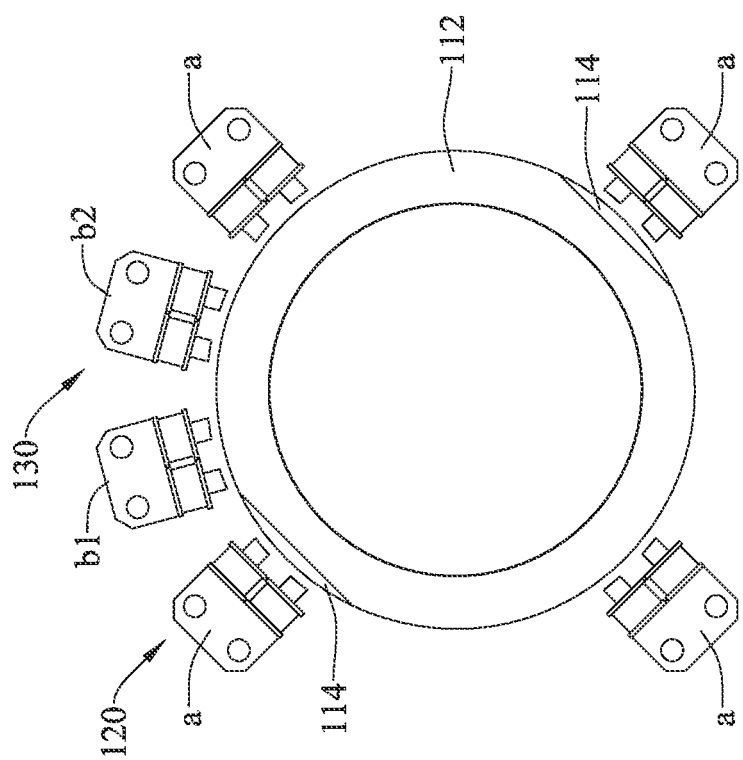
Figure 20:
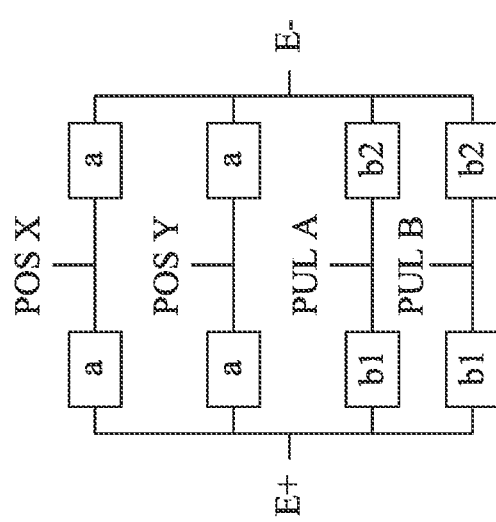
Figure 21:
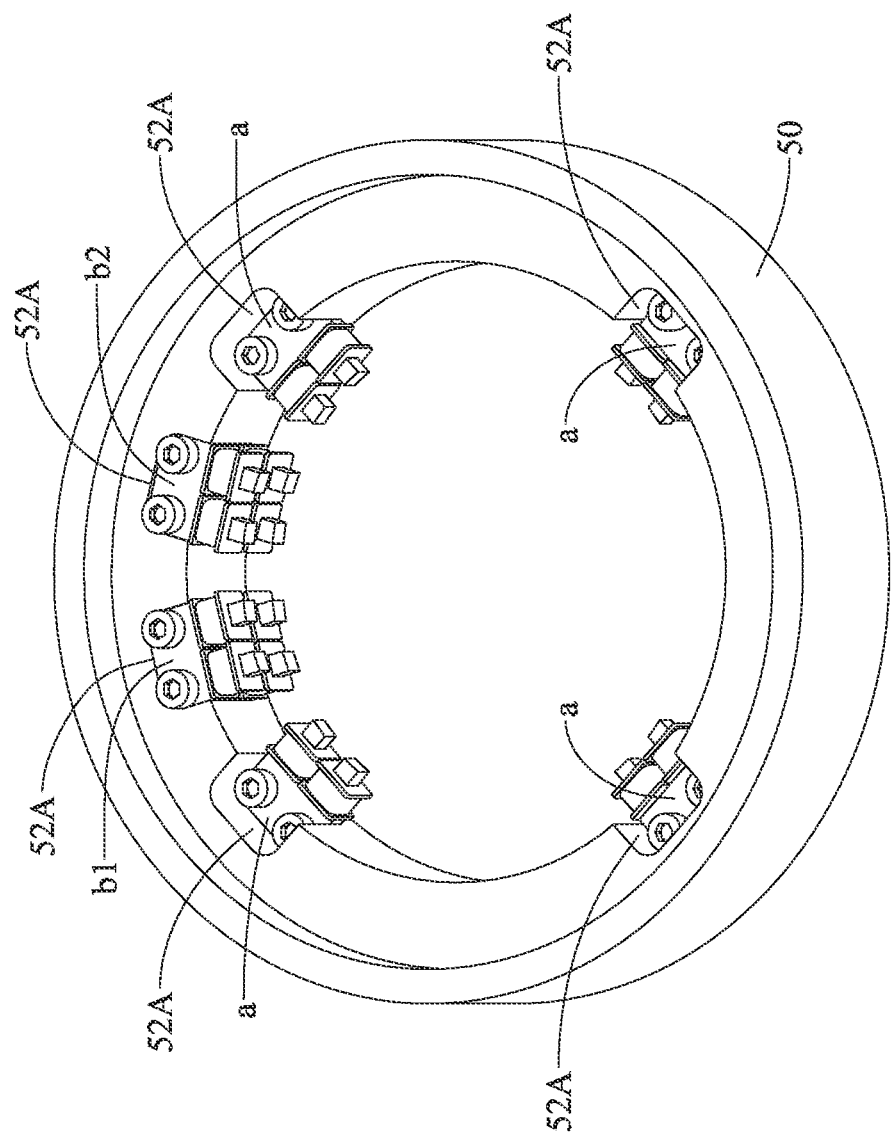

FIG. 5 demonstrates schematically a framework for signal generation of the sensor device for high speed rotating machine of FIG. 1;

FIG. 6 demonstrates schematically the radial displacement sensors and the rotational speed sensors of FIG. 1 assembled at the non-magnetic base;

FIG. 7 shows schematically that the sensor device for high speed rotating machine of this disclosure is equipped with a magnetic permeable ring made of another material;

FIG. 8 is a schematic perspective view of another embodiment of the sensor device for high speed rotating machine in accordance with this disclosure;

FIG. 9 is a schematic front view of FIG. 8;

FIG. 10 demonstrates schematically a framework for signal generation of the sensor device for high speed rotating machine of FIG. 8;

FIG. 11 demonstrates schematically the radial displacement sensors and the rotational speed sensors of FIG. 8 assembled at the non-magnetic base;

FIG. 12 is a schematic perspective view of a further embodiment of the sensor device for high speed rotating machine in accordance with this disclosure;

FIG. 13 is a schematic front view of FIG. 12;

FIG. 14A is a schematic perspective view of the four-probe type sensor of FIG. 12;

FIG. 14B is a schematic exploded view of FIG. 14A;

FIG. 15A is another exemplary example of the four-probe type sensor in accordance with this disclosure;

FIG. 15B is a further exemplary example of the four-probe type sensor in accordance with this disclosure;

FIG. 16 demonstrates schematically a framework for signal generation of the sensor device for high speed rotating machine of FIG. 12;

FIG. 17 demonstrates schematically the radial displacement sensors and the rotational speed sensors of FIG. 12 assembled at the non-magnetic base;

FIG. 18 is a schematic perspective view of one more embodiment of the sensor device for high speed rotating machine in accordance with this disclosure;

FIG. 19 is a schematic front view of FIG. 18;

FIG. 20 demonstrates schematically a framework for signal generation of the sensor device for high speed rotating machine of FIG. 18; and FIG. 21 demonstrates schematically the radial displacement sensors and the rotational speed sensors of FIG. 18 assembled at the non-magnetic base.

DETAILED DESCRIPTION

In the following description, specific embodiments of the present disclosure will be further described in conjunction with the accompanying drawings and examples, and the following examples are only used to further and clearly illustrate technical solutions of the present disclosure, not to limit the scope of the present disclosure.

It should be noted that, in the following embodiments, the so-called "first" and "second" are used to describe different elements, not for limiting thereto. In addition, for convenience and clarity, the thickness or size of each element in the drawings is shown in an exaggerated, omitted or rough manner for the understanding and reading of those skilled in the art. Also, the size of each element in any of the drawings is not to demonstrate the actual size of the elem, thus is not used to limit the conditions for the implementation of the present disclosure, and therefore has no technical substantive significance. Any modification of the structure, change of the proportional relationship or adjustment of the size will not affect the effect and achievement of the present disclosure. For the purposes of this disclosure, they should still fall within the scope of the technical content disclosed in this disclosure.

Figure 2:
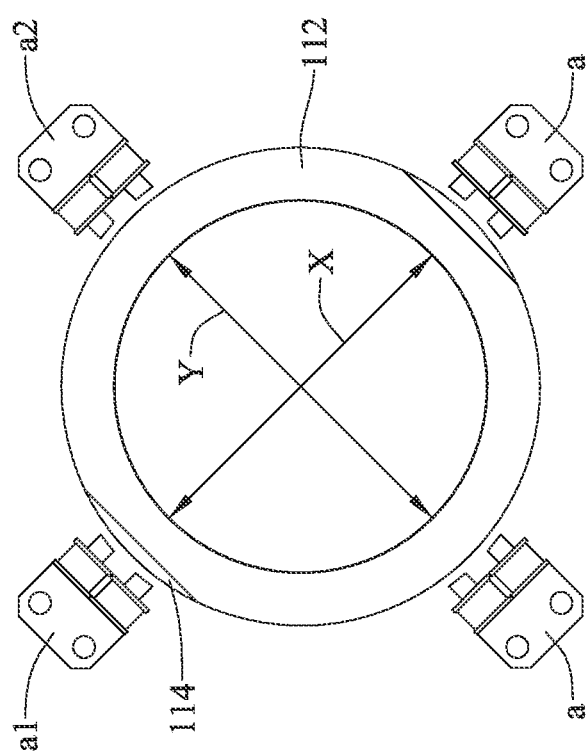
FIG. 2 is a schematic front view of FIG. 1.

FIG. 1 is a schematic perspective view of an embodiment of the sensor device for high speed rotating machine in accordance with this disclosure, and FIG. 2 is a schematic front view of FIG. 1. Referring now to FIG. 1 and FIG. 2, in this embodiment of the sensor device for high speed rotating machine 100, the high speed rotating machine is a maglev centrifugal machine.

In particular, the high speed rotating machine herein can be a high efficiency centrifugal chiller, a centrifugal compressor or any the like. The high speed rotating machine is equipped with a high speed spindle with magnetic bearings, and high speed spindle with magnetic bearings includes at least a high speed motor, a front radial bearing, a rear radial bearing, a front axial bearing and a rear axial bearing. Upon such an arrangement of the high speed spindle with magnetic bearings, a non-contact self-rotation can be performed.

In this embodiment, the sensor device for high speed rotating machine 100 includes a rotating body 110 and a sensor assembly. The sensor assembly includes four radial displacement sensors "a" and two rotational speed sensors a1, a2. The rotating body 110 includes a magnetic permeable ring 112 and at least one positioning structure 114. The rotating body 110 is defined with an axial direction AX and a radial direction RA, in which the radial direction RA can be one of diameter directions which are all perpendicular to the axial direction AX. The magnetic permeable ring 112, disposed on a surface of the rotating body 110, includes a radial displacement sensing area G1 (in particular, the outer surface of the ring) and a rotational speed sensing area G2. For a concise explanation, in FIG. 1, the radial displacement sensing area G1 and the rotational speed sensors G2 are separated by a dashed line. The radial displacement sensing area G1 is adjacent and also connected to the rotational speed sensing area G2. The positioning structure 114, disposed in the rotational speed sensing area G2, has a particular surface different to the surface of the magnetic permeable ring 112, by which air-gap spacing would be changed while the rotating body 110 is rotating. For example, as shown in FIG. 1, the positioning structure 114 is structured to be a cutout surface from the surface of the magnetic permeable ring 112. This cutout surface can be a groove, a plane, a tooth or any relevant structure.

In this embodiment, these four radial displacement sensors a are arranged to surround the rotating body 110, and all the radial displacement sensors a are disposed separately in the radial displacement sensing area G1. As shown in FIG. 1 and FIG. 2, these four radial displacement sensors a are distributed in an equal-spacing arrangement on the magnetic permeable ring 112 by keeping relevant radial air-gap spacing to the magnetic permeable ring 112. Preferably, two of these four radial displacement sensors a are oppositely arranged on the rotating body 110 in a radial direction RA and connected to form a first direction X, while another two thereof are also oppositely arranged on the rotating body 110 in another radial direction RA and connected to form a second direction Y perpendicular to the first direction X. Namely, any two in the same pair of the radial displacement sensors a are disposed oppositely along the same diameter of the magnetic permeable ring 112. In other words, the radial displacement sensors a in the first direction X and the second direction Y (i.e., two radial directions RA) are purposely to be differentially arranged. Thereupon, the differential detection theory for generating voltage differences between any two of the radial displacement sensors a is applied to generate differential signals by differentiated positions of the radial displacement sensors a around the magnetic permeable ring 112.

Figure 3:
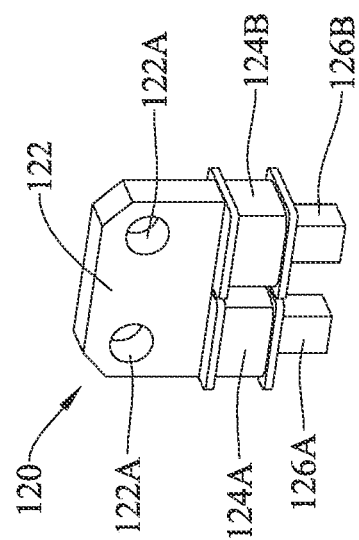
FIG. 3 is a schematic perspective view of the double-probe type sensor of FIG. 1.

In this embodiment, the radial displacement sensors a double-probe type sensor 120, as shown in FIG. 3. The double-probe type sensor 120 includes a magnetic metal block 122, two coils 124A, 124B and two probes 126A, 126B. The magnetic metal block 122 is furnished with two locking holes 122A for engaging the non-magnetic base 50 as shown in FIG. 6. The probes 126A, 126B are individually connected with the magnetic metal block 122. The two coils 124A, 124B winding around two respective legs (not labeled on the figure) of the magnetic metal block 122 protrude the corresponding probes 126A, 126B from corresponding ends of the two respective coils 124A, 124B. It shall be explained that, in this disclosure, the double-probe type sensor 120 is not a simple sheet structure of ring-type Si steel in the art, but a monomer adopted from a sheet of the ring-type Si steel is modified to be the magnetic metal block 122. As such, the required number of components can be reduced, and a magnetic path between the magnetic metal block 122 and the rotating body 110 would be formed right after the coils 124A, 124B are energized.

As shown in FIG. 1, in this embodiment, the two rotational speed sensors a1, a2 are separately disposed on the outer surface of the rotating body 110, at positions different to those mounting the radial displacement sensors a. In particular, the rotational speed sensors a1, a2 are individually adjacent to these radial displacement sensors a. In this embodiment, the assembly direction L1 of the magnetic heads (for example, the probes 126A, 126B in FIG. 3) of the rotational speed sensors a1, a2 is coincided with one radial direction RA of the rotating body 110, and the assembly direction L2 of the magnetic heads (for example, the probes 126A, 126B in FIG. 3) of the radial displacement sensors a is coincided with another radial direction RA of the rotating body 110. In addition, the assembly direction L1 of any of the rotational speed sensors a1, a2 is parallel to the assembly direction L2 of any of the radial displacement sensors a; i.e., both perpendicular to the axial direction AX. The rotational speed sensors a1, a2 are disposed in correspondence to the rotational speed sensing area G2.

In detail, the rotational speed sensors a1, a2 of this embodiment are all double-probe type sensors 120, and the rotational speed sensors a1, a2 are disposed among the radial displacement sensors a (for example, in FIG. 1, between the lower two radial displacement sensors a). In particular, the rotational speed sensors a1, a2 can pair individually the radial displacement sensors a in the axial direction AX (for example, the two top radial displacement sensors a in FIG. 1). In addition, the assembly direction of the rotational speed sensors a1, a2 is parallel to that of the radial displacement sensors a. Thereupon, it can be realized that, while in assembling the rotational speed sensors a1, a2 and the radial displacement sensors a of this embodiment, a common assembly space can be achieved to simplify structurally the entire sensor mechanism. Thus, the manufacturing cost and time can be substantially reduced.

Figure 4:
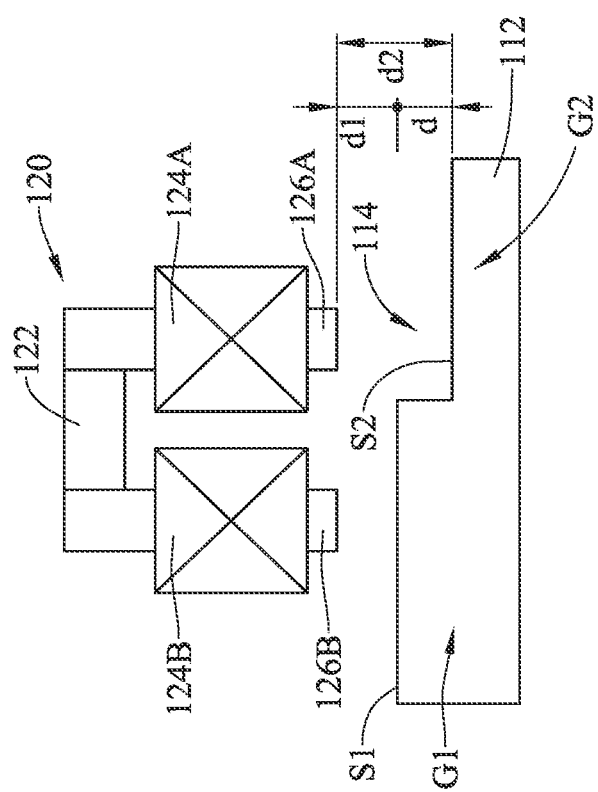
FIG. 4 is a schematic view of the rotational-speed displacement sensor and the magnetic permeable ring of FIG. 1.

In this embodiment, the rotational speed sensors a1, a2 are spaced from the magnetic permeable ring 112 so as to obtain radial air-gap spacing. Referring to FIG. 4, the rotational speed sensors and the magnetic permeable ring are schematically shown. It shall be noted that, in FIG. 4, the assembly direction of the rotational speed sensors is not limited thereto, but only sketched to explain the positioning structures and the air-gap spacing. For example, all the probes of the corresponding rotational speed sensors are disposed on the same rotational speed sensing area G2. For another example, in the cross-area sensing, the two probes of the same sensor would be located to the radial displacement sensing area G1 and the rotational speed sensing area G2, respectively. Certainly, for the four-probe type sensor, the four probes would be distributed to the radial displacement sensing area G1 and the rotational speed sensing area G2. In one embodiment, in the rotational speed sensor a1 or a2 (i.e., the double-probe type sensor 120 herein), a first distance d1 is defined to the space measured from a bottom end of the probe 126A or 126B to an upper top surface S1 of the magnetic permeable ring 112. The positioning structure 114 is formed to have a cutout surface from the magnetic permeable ring 112 (the positioning structure 114 can be seen as a recess on the magnetic permeable ring 112). The rotational speed sensor a1 or a2 (the double-probe type sensor 120 in this embodiment) is spaced from a base surface of the positioning structure 114 by a second distance d2. The second distance d2 is greater than the first distance d1 by a distance difference d. As shown, the distance difference d is the distance from a lower top surface S1 of the positioning structure 114 to an upper top surface S2 of the and magnetic permeable ring 112. With this distance difference d, a differential circuit (i.e., a differential amplifier) would be applied to generate a differential signal and a corresponding voltage pulse. Further, a period of the voltage pulse would be calculated to derive the equivalent speed or rotational speed. In this disclosure, this distance difference d can be adjusted according to the practical magnetic arrangement. The magnetic permeable ring 112 would be integrated with the rotational speed sensor a1 or a2 (the double-probe type sensor 120 in this embodiment) to form a closed magnetic loop, and the positioning structure 114 and the rotational speed sensor a1 or a2 would be paired to form an additional air-gap spacing over the radial air-gap spacing upon when the rotating body 110 is rotated.

FIG. 5 demonstrates schematically a framework for signal generation of the sensor device for high speed rotating machine of FIG. 1. In this embodiment, two separate radial displacement sensors a on the first direction X among many radial directions would generate different voltages corresponding to these two radial displacement sensors a, through the differential amplifier of the sensor circuit, and further generate differential signals corresponding to the voltages. Namely, differential signals can be produced by these two radial displacement sensors a so as to obtain an X-directional displacement signal POS X. Similarly, differential signals can be produced by another two radial displacement sensors a so as to obtain a Y-directional displacement signal POS Y. On the other hand, regarding the rotational speed signals, pairs of sensors may utilize the differential amplifier to generate corresponding signals. A significant difference is that the magnification of the rotational speed signal is much larger than that of the radial signal. The rotational speed sensor a1 can integrate the radial displacement sensor a to generate differential signals, and further to obtain a first pulse signal PUL A. Also, the rotational speed sensor a2 can be integrated with the radial displacement sensor a to produce corresponding differential signal, and further to obtain a second pulse signal PUL B. The first pulse signal PUL A and the second pulse signal PUL B stand for the rotational speed signals in different directions. After calculation, a difference between two electric fields E+, E− can be obtained. Thereupon, stability in detecting the rotational speed can be maintained, and the complexity in circuit design can be reduced. In another embodiment, the rotational speed sensors a1 and the rotational speed sensors a2 can be directly applied to form the differential signal so as further to obtain the corresponding rotational speed signals. In this embodiment, the rotating body 112 has two positioning structures 114. When the rotating body 112 rotates, the rotational speed sensor a1 at the first positioning structure 114 would generate the first pulse signal PUL A, and the rotational speed sensor a2 at the second positioning structure 114 can be used to generate the second pulse signal PUL B. With the first pulse signal PUL A and the second pulse signal PUL B, a time difference can be derived to be determined as the rotations of the rotating body 112.

Upon the aforesaid arrangement, the sensor device for high speed rotating machine 100 can utilize output signals of the two rotational speed sensors a1, a2 and the pulses generated by the differential circuit (i.e., the differential amplifier that can amplify a difference between two voltage inputs by a predetermined gain) to measure a corresponding pulse frequency. Thus, the rotational speed and the turning direction of the rotating body 110 can be determined and derived from the measured pulse frequency, such that the stability in detecting the rotational speed can be maintained. The complexity in circuit design can be reduced. In addition, the rotational speed sensors a1, a2 and the radial displacement sensors a can be installed and operated together in the limited space around the rotating body 110.

In addition, as shown in FIG. 6, the radial displacement sensors and the rotational speed sensors of FIG. 1 assembled at the non-magnetic base are demonstrated schematically. In this embodiment, the sensor device for high speed rotating machine 100 further includes a non-magnetic base 50 disposed out of the rotating body 110 of FIG. 1. The radial displacement sensors a and the rotational speed sensors a1, a2 are separately disposed to the non-magnetic base 50. In one embodiment, the non-magnetic base 50 can be a base made of aluminum. The non-magnetic base 50 can include a plurality of first assembly cavities 52A. The exact quantity, dimensions and configurations of the first assembly cavities 52A are determined according to practical requirements of the radial displacement sensors a and the rotational speed sensors a1, a2. For example, in this embodiment, the radial displacement sensors a and the rotational speed sensors a1, a2 are individually mounted into the corresponding first assembly cavities 52A, and the dimensions of the first assembly cavities 52A are adjusted to accommodate the respective radial displacement sensors a and the rotational speed sensors a1, a2. In the same first assembly cavity 52A, the radial displacement sensor a may be disposed at an upper position of the first assembly cavity 52A having a width H1, while the rotational speed sensor a1 or a2 is disposed at a lower position thereof having a width H2. In particular, the width H1 is equal to the width H2. Then, fasteners 60 can be applied to fix the radial displacement sensors a and the rotational speed sensors a1, a2, so as to lock the sensors to the non-magnetic base 50. For example, the fastener 60 can be applied to the locking hole 122A of the magnetic metal block 122 shown in FIG. 3, such that the respective sensor can be firmly fixed to the base 50.

Referring back to FIG. 1, the magnetic permeable ring 112 can be made of a magnetic material or a conductive metal material. Further, in order to increase the sensitivity of the radial displacement sensors a upon the air gaps in the radial displacement sensing area G1, the radial displacement sensing area G1 shall be made of a magnetic material (such as a silicon steel sheet or an iron), and the rotational speed sensing area G2 corresponding to the rotational speed sensors a1, a2 shall be made of a magnetic material or as a metal ring. Thus, both the radial displacement sensing area G1 and the rotational speed sensing area G2 can be made of the same material (for example, the same magnetic material) so as to make the magnetic permeable ring 112 to be a magnetic metal ring. Namely, the rotating body 110 can be integrally formed to utilize the same magnetic permeable ring.

In another embodiment shown in FIG. 7, the radial displacement sensing area G11 and the rotational speed sensing area G12 of the magnetic permeable ring 112A are made of different materials. For example, the radial displacement sensing area G11 is made of a magnetic material so as to form a magnetic metal ring, while the rotational speed sensing area G12 is made of a non-magnetic metal so as to form a non-magnetic metal ring. Namely, in this embodiment, the radial displacement sensing area G11 and the rotational speed sensing area G12 are connected in a hetero junction manner.

FIG. 8 is a schematic perspective view of another embodiment of the sensor device for high speed rotating machine in accordance with this disclosure, and FIG. 9 is a schematic front view of FIG. 8. As shown, a difference between this embodiment and the previous embodiment shown in FIG. 1 through FIG. 7 is that, in this embodiment, a different arrangement is applied to the rotational speed sensors a1, a2. The assembly direction L3 of the magnetic heads (the probes 126A, 126B in FIG. 3) of the rotational speed sensors a1, a2 is parallel to the axial direction AX, and the rotational speed sensors a1, a2 are mounted to cross the radial displacement sensing area G1 and the rotational speed sensing area G2. After the magnetic-head coils of the rotational speed sensors a1, a2 are energized, a closed magnetic loop including the magnetic permeable ring 112 would be formed to provide a magnetic path parallel to the axial direction AX but perpendicular to the radial direction RA. On the other hand, the assembly direction L4 of the magnetic heads (the probes 126A, 126B in FIG. 3) of the radial displacement sensors a is parallel to the radial direction RA of the rotating body 110.

FIG. 10 demonstrates schematically a framework for signal generation of the sensor device for high speed rotating machine of FIG. 8. In the framework of this embodiment, the two separate radial displacement sensors a in the first direction X among many radial directions would generate different signals so as to obtain an X-directional displacement signal POS X, while the two separate radial displacement sensors a in the second direction Y among many radial directions would generate different signals so as to obtain a Y-directional displacement signal POS Y. Regarding the rotational speed signals, different to FIG. 5, in this embodiment, after the two rotational speed sensors a1, a2 form the differential signal and the coils of the rotational speed sensors a1, a2 are energized, a magnetic path would be established to cross the radial displacement sensing area G1 and the rotational speed sensing area G2. As soon as the magnetic path touches the positioning structure 114, the rotational speed sensor a1 would immediately detect the existence of the positioning structure 114 due to an abrupt increase upon the first distance d1 by a distance difference d. Simultaneously, the first distance d1 to the rotational speed sensor a2 is maintained. Thereupon, the differential circuit would generate a first pulse signal PUL A, accordingly. In addition, the second pulse signal PUL B can be generated according to a similar method. The first pulse signal PUL A and the second pulse signal PUL B can be obtained. Thereupon, beside the structuring can be simplified, the stability in detecting the rotational speed can be maintained, and also the complexity in circuit design can be reduced.

In addition, FIG. 11 demonstrates schematically the radial displacement sensors and the rotational speed sensors of FIG. 8 assembled at the non-magnetic base. As shown in FIG. 8, FIG. 9 and FIG. 11, the assembly direction of the rotational speed sensors a1, a2 is perpendicular to the assembly direction of the radial displacement sensors a. In addition, the magnetic heads (such as the probes 126A, 126B of FIG. 3) of the rotational speed sensors a1, a2 are parallel to the axial direction AX, and the magnetic heads (such as the probes 126A, 126B of FIG. 3) of the radial displacement sensors a are parallel to the radial direction RA. Nevertheless, all the sensors are disposed at the same circumference. The non-magnetic base 50 includes the aforesaid first assembly cavities 52A and also second assembly cavities 52B configured differently to the first assembly cavities 52A for mounting the rotational speed sensors a1, a2. In particular, the width H1 of the first assembly cavity 52A is greater than the width H4 of the second assembly cavity 52B. Except that the radial displacement sensor a is locked by the fasteners 60 resembled to that shown in FIG. 6, the rotational speed sensors a1, a2 of this embodiment can be planted into the corresponding second assembly cavities 52B by dispensing. In other words, the rotational speed sensors a1, a2 and the radial displacement sensors a of this embodiment can be fixed by different methods such as locking or dispensing.

FIG. 12 is a schematic perspective view of a further embodiment of the sensor device for high speed rotating machine in accordance with this disclosure, and FIG. 13 is a schematic front view of FIG. 12. A difference between this embodiment and that shown from FIG. 8 to FIG. 11 is that, in this embodiment of the sensor device for high speed rotating machine 300, the rotational speed sensor b1 or b2 is a four-probe type sensor 130 disposed between two of the radial displacement sensors a.

FIG. 14A is a schematic perspective view of the four-probe type sensor of FIG. 12, and FIG. 14B is a schematic exploded view of FIG. 14A. Referring to FIG. 12 through FIG. 14B, the four-probe type sensor 130 includes magnetic metal blocks 132, 134, 136, coils 136A, 136B, 136C, 136D, and probes 138A, 138B, 138C, 138D. In particular, the magnetic metal block 132, the coils 136A, 136B and the probes 138A, 138B are integrated together to form a double-probe type sensor (similar to the double-probe type sensor 120 of FIG. 3 or FIG. 12), and the magnetic metal block 134, the coils 136C, 136D and the probes 138C, 138D are integrated together to form another double-probe type sensor. The magnetic metal block 136 is disposed between another two magnetic metal blocks 132, 134 individually connected with the corresponding double-probe sensors, in which the magnetic metal block 136 doesn't have any probe. After the coils 136A, 136B, 136C, 136D are energized, a plurality of magnetic paths would be formed between any of the magnetic metal blocks 132, 134, 136 and the rotating body 110, between the two coils 136A, 136B or 136C, 136D, and between any two of the magnetic metal blocks 132, 134, 136 of the double-probe type sensor. The four-probe sensor 130 may have two to four coils. In particular, the four-probe sensor 130 can have four coils 136A, 136B, 136C, 136D to individually generate corresponding magnetomotive forcing. For example, as shown in FIG. 15A, the four-probe sensor 130A is equipped with two coils 136B, 136D. For a further example shown in FIG. 15B, the four-probe sensor 130B is equipped with three coils 136A, 136B, 136D. With different numbers of coils to connect in series, a plurality of closed-loop magnetic paths and different inductance ranges would be formed. Namely, with the four-probe type sensors 130, 130A, 130B, various combinations of probes can be formed to contribute different inductance. Thereupon, convenience in assembly can be obtained, and appropriate circuit arrangements for desired harmonic points within limited space and framework for the rotating body 110 with different materials can be feasible.

FIG. 16 demonstrates schematically a framework for signal generation of the sensor device for high speed rotating machine of FIG. 12. In this example, the two separate radial displacement sensors a in the first direction X among many radial directions would generate different signals so as to obtain an X-directional displacement signal POS X, while the two separate radial displacement sensors a in the second direction Y among many radial directions would generate different signals so as to obtain a Y-directional displacement signal POS Y. Regarding the rotational speed signals, different to FIG. 10, in this embodiment, with the two rotational speed sensors b1, b2 to form the four-probe sensor 130, magnetic paths simultaneously across the radial displacement sensing area G1 and the rotational speed sensing area G2 would be generated. While crossing the positioning structure 114 in the rotational speed sensing area G2, the rotational speed sensors b1, b2 of the four-probe sensor 130 would associate the radial displacement sensing area G1 and the rotational speed sensing area G2 together to generate an electromagnetic induction signal for further forming corresponding differential signal, and thus the first pulse signal PUL A and the second pulse signal PUL B can be obtained.

In addition, FIG. 17 demonstrates schematically the radial displacement sensors and the rotational speed sensors of FIG. 12 assembled at the non-magnetic base. As shown in FIG. 12, FIG. 13 and FIG. 17, in comparison to the assembly of FIG. 11, the difference is that the four-probe sensor 130 having the rotational speed sensors b1, b2 in this embodiment can be planted into the third assembly cavity 52C and fixed by dispensing. In other words, the rotational speed sensors b1, b2 and the radial displacement sensors a of this embodiment can be fixed by different methods such as locking or dispensing, according to the present mounting. In addition, the magnetic heads (such as the probes 126A, 126B of FIG. 3) of the rotational speed sensors b1, b2 are parallel to the radial direction RA, and the magnetic heads (such as the probes 126A, 126B of FIG. 3) of the radial displacement sensors a are parallel to the radial direction RA. Further, all the sensors are disposed on the same circumference, and the width H1 of the first assembly cavity 52A is equal to the width H3 of the third assembly cavity 52C.

FIG. 18 is a schematic perspective view of one more embodiment of the sensor device for high speed rotating machine in accordance with this disclosure, and FIG. 19 is a schematic front view of FIG. 18. A difference between this embodiment and the embodiment of FIG. 12 through FIG. 17 is that, in this sensor device for high speed rotating machine 400, the assembly direction of the rotational speed sensors b1, b2 is parallel to the assembly direction of the radial displacement sensors a. In particular, the magnetic heads (such as the probes 138A, 138B, 138C, 138D of FIG. 14) of the rotational speed sensors b1, b2 are arranged in the radial direction RA of the rotating body 110, and the magnetic heads (such as the probes 126A, 126B of FIG. 3) of the radial displacement sensors a are arranged in the radial direction RA of the rotating body 110. Namely, the assembly directions of the magnetic heads of the rotational speed sensors b1, b2 and the radial displacement sensors a are perpendicular to the axial direction AX. In addition, all the sensors are disposed on the same circumference. Thus, the calculations for the framework of FIG. 20 is resembled to that of FIG. 16. However, in FIG. 21, different to the aforesaid FIG. 17, the rotational speed sensors b1, b2 of this embodiment are located into the corresponding first assembly cavities 52A by locking.

In summary, according to the aforesaid embodiments of the present disclosure, the output signals of the two rotational speed sensors are used to generate pulse waves through the differential circuit, and the rotational speed and turning direction of the rotating body can be calculated by measuring the frequency of the pulse waves (in the present disclosure, two rotational speed sensors can generate two sets of pulse waves in sequence, and, by comparing the sequence of the pulse waves, the turning direction can be judged, and the rotational speed can be calculated by evaluating the frequency of the pulse waves). Also, different arrangements of the rotational speed sensors and the radial displacement sensors are provided. Thus, the stability in detecting the rotational speed can be maintained, and the complexity in designing the circuit can be reduced. In addition, in the limited spacing around the rotating body, different spacing between the rotating body and the sensors can be arranged to meet different applications.

Furthermore, in the aforesaid embodiments of the present disclosure, by connecting different numbers of coils in series, a plurality of closed-loop magnetic paths and different inductance ranges can be formed, and the four-probe sensors can be equipped with probes to provide different combinations of inductances. Thus, convenience for assembly can be obtained. For the application of the rotating body with different materials, in the limited spacing and structuring, an appropriate circuit to allocate suitable resonance points can be then feasible.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A sensor device for a high speed rotating machine, comprising:
    a rotating body, including a magnetic permeable ring and at least one positioning structure, the magnetic permeable ring further including a radial displacement sensing area and a rotational speed sensing area, the at least one positioning structure being disposed in the rotational speed sensing area, a surface of the at least one positioning structure being different to a surface of the magnetic permeable ring;
    a sensor assembly, including:
        four radial displacement sensors, disposed separately around the rotating body, each of the four radial displacement sensors being disposed in correspondence to the radial displacement sensing area, each of the four radial displacement sensors being separated from the magnetic permeable ring by a radial air-gap spacing, wherein each of the four radial displacement sensors is a double-probe type sensor; and
        two rotational speed sensors, disposed separately around the rotating body, each of the two rotational speed sensors being disposed next to one of the four radial displacement sensors in correspondence to the rotational speed sensing area, wherein each of the two rotational speed sensors is a four-probe type sensor; and
    a non-magnetic base located outside the rotating body;
    wherein the double-probe type sensor includes a magnetic metal block, two coils, and two probes substantially parallel to each other, where the two coils are separately disposed to surround the magnetic metal block;
    wherein the four-probe type sensor includes another two double-probe type sensors and an intermediate another magnetic metal block connected with and disposed between the another two double-probe sensors;
    wherein the two rotational speed sensors and the four radial displacement sensors are separately disposed at the non-magnetic base.

2. The sensor device of claim 1, wherein the four-probe type sensor has 2 to 4 coils.

3. The sensor device of claim 1, wherein an assembly direction of the two rotational speed sensors is parallel to an assembly direction of the four radial displacement sensors.

4. The sensor device of claim 1, wherein an assembly direction of the two rotational speed sensors is perpendicular to an assembly direction of the four radial displacement sensors.

5. The sensor device of claim 1, wherein the four radial displacement sensors are separately disposed in an equal-spacing arrangement on the magnetic permeable ring, two of the four radial displacement sensors are oppositely disposed in a radial direction of the rotating body, and another two of the four radial displacement sensors are disposed oppositely in another radial direction thereof.

6. The sensor device of claim 5, wherein, another one of the two rotational speed sensors is disposed axially with respect to the rest of the four radial displacement sensors, and an assembly direction of the two rotational speed sensors is parallel to an assembly direction of the four radial displacement sensors.

7. The sensor device of claim 5, wherein, the two rotational speed sensors are disposed among the four radial displacement sensors.

8. The sensor device of claim 7, wherein an assembly direction of the two rotational speed sensors is perpendicular to an assembly direction of the four radial displacement sensors.

9. The sensor device of claim 7, wherein an assembly direction of the two rotational speed sensors is parallel to an assembly direction of the four radial displacement sensors.

10. The sensor device of claim 1, wherein a top surface of the at least one positioning structure is lower than a top surface of the magnetic permeable ring.

11. The sensor device of claim 1, wherein the magnetic permeable ring is made of a magnetic material or a conductive metal material.

12. The sensor device of claim 1, wherein the radial displacement sensing area and the rotational speed sensing area are made of the same material.

13. The sensor device of claim 1, wherein the radial displacement sensing area and the rotational speed sensing area are made of different materials.

14. The sensor device of claim 1, wherein the radial displacement sensing area is a magnetic metal ring, and the rotational speed sensing area is a magnetic metal ring or a non-magnetic metal ring.

15. The sensor device of claim 1, wherein any two of the four radial displacement sensors are used to generate a differential signal for further deriving a directional displacement signal, the two rotational speed sensors generate a voltage pulse via the at least one positioning structure, and further a period of the voltage pulse is calculated and transformed into a rotational speed.

16. The sensor device of claim 1, wherein the magnetic metal block of each of the another two double-probe type sensors of the four-probe type sensor span both the radial displacement sensing area and the rotational speed sensing area.

* * * * *